Nov. 22, 1966    L. S. WIRT    3,286,786
GAS TURBINE EXHAUST SILENCER AND ACOUSTICAL MATERIAL THEREFOR
Filed Dec. 23, 1964    3 Sheets-Sheet 1

INVENTOR.
LESLIE S. WIRT
BY
Herschel C. Omohundro
ATTORNEY

Nov. 22, 1966   L. S. WIRT   3,286,786
GAS TURBINE EXHAUST SILENCER AND ACOUSTICAL MATERIAL THEREFOR
Filed Dec. 23, 1964   3 Sheets-Sheet 2
Fig. 3
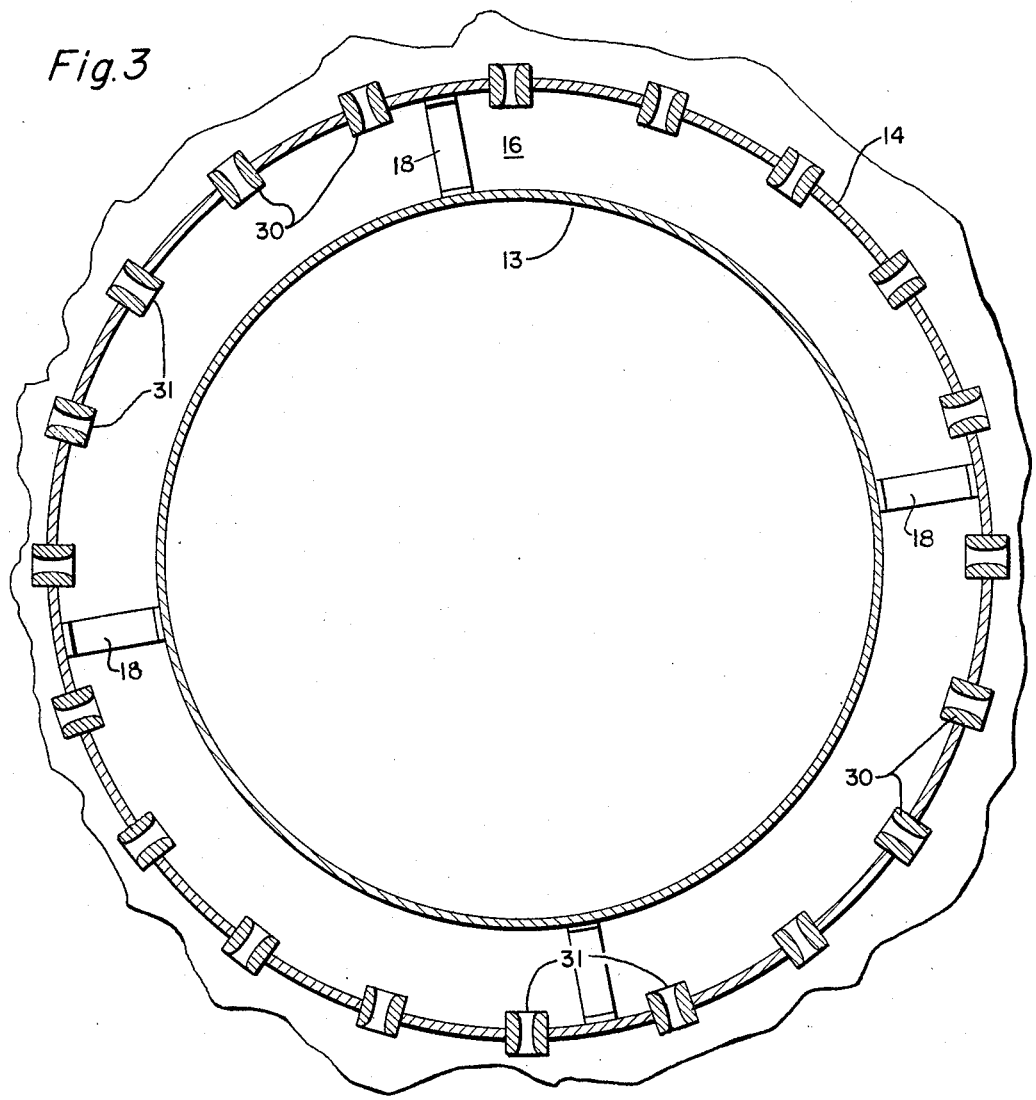
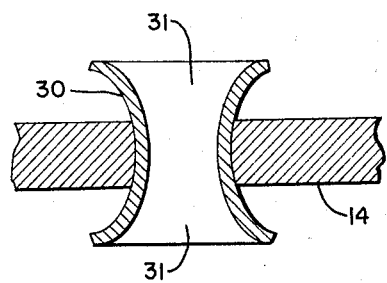
Fig. 4
INVENTOR.
LESLIE S. WIRT
BY
Herschel C. Omohundro
ATTORNEY Nov. 22, 1966 L. S. WIRT 3,286,786
GAS TURBINE EXHAUST SILENCER AND ACOUSTICAL MATERIAL THEREFOR
Filed Dec. 23, 1964 3 Sheets-Sheet 3
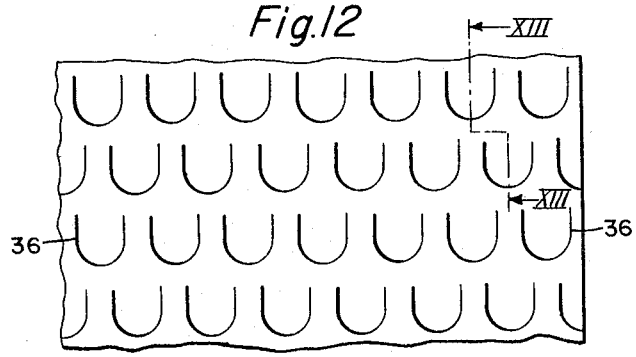
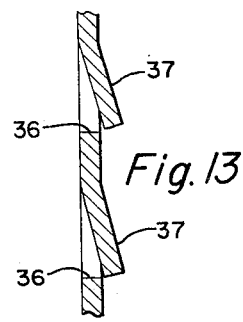
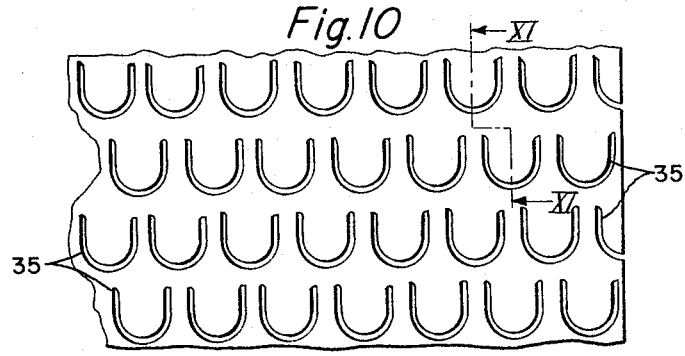
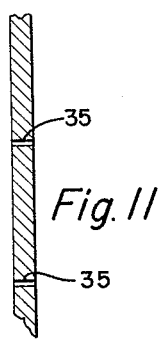
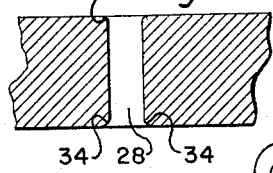
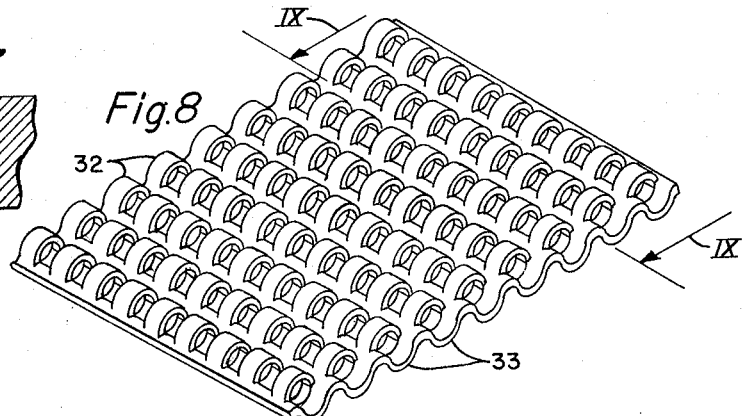
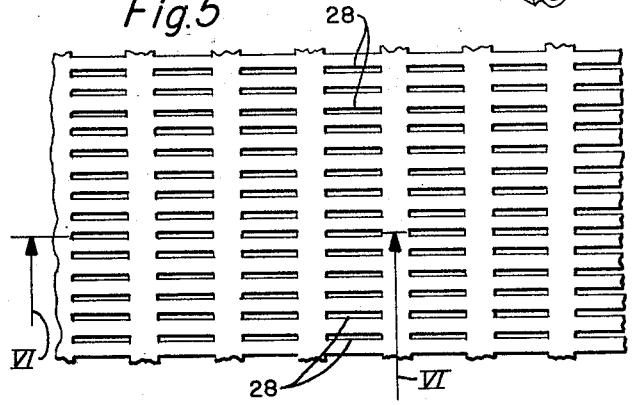
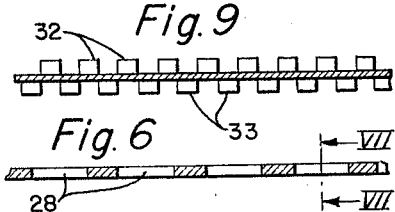
INVENTOR.
LESLIE S. WIRT
BY
Herschel C. Omohundro
ATTORNEY

3,286,786
Patented Nov. 22, 1966

---

3,286,786
GAS TURBINE EXHAUST SILENCER AND ACOUSTICAL MATERIAL THEREFOR
Leslie S. Wirt, Phoenix, Ariz., assignor to The Garrett Corporation, Los Angeles, Calif., a corporation of California
Filed Dec. 23, 1964, Ser. No. 420,608
19 Claims. (Cl. 181—50)

This application is a continuation-in-part of my application Serial No. 178,117 filed March 7, 1962, entitled, Permeable Sheet Metal and Method of Making the Same, and another application Serial No. 304,314 filed August 26, 1963, entitled, Gas Turbine Exhaust Silencer, both of these earlier filed applications being now abandoned.

This invention relates generally to the science of acoustics. More particularly it relates to improvements in sound-absorptive acoustical resonators suitable for use in silencers for gas turbine exhaust ducts or similar installations.

The gas turbine is a compact, lightweight source of power particularly adaptable for use in the generation of auxiliary power in aircraft. One objection to its use, however, lies in the noise generated by the rapidly moving vanes and the swiftly rushing, expanding gases as they are exhausted from the machine. These noises can be reduced in part by fitting the machines with silencers constructed in accordance with wellknown practices, but conventional acoustical devices are in general so bulky and heavy that they place an undesirable premium on their use in aircraft. Another objection to the use of conventional silencing devices is that many of them use fibrous materials to provide the necessary sound absorptive. Such materials used in the exhaust duct of a gas turbine create a serious fire hazard since delayed ignition during a starting attempt may permit a considerable amount of liquid fuel to be sprayed into the exhaust duct. Normally, upon such occurrences, the fuel is allowed to drain away or the duct is purged by a flow of air before a subsequent start is attempted. When the fibrous material is present, however, large amounts of the fuel will be retained thereby, and upon the occurrence of ignition in the next start and consequent flow of hot gases rich with oxygen the retained fuel will burn like a torch with an intense potentially destructive flame.

One object of this invention is to provide an efficient sound absorbing device which does not require the use of fibrous materials but employs a plurality of acoustical resonators of different types and is designed to minimize the transmission of sounds over a broad range of frequencies.

Another object of this invention is to provide a silencer for the exhaust of a gas turbine which silencer has a plurality of coaxial tubular duct sections disposed to form a first passage, for receiving the turbine exhaust flow to be silenced, surrounded by one or more substantially dead air spaces, and furnishing certain of the duct sections with openings of predetermined size and shape which cooperate with the air spaces to produce tuned resonators which effectively damp the sounds by dissipating the energy thereof.

Still another object of this invention is to so form the openings in the duct sections of the silencer mentioned in the preceding paragraph that the dead air spaces can be kept at a minimum thickness whereby the completed unit will occupy as small a space as possible, thus adapting it especially for use in aircraft.

Another object is to so form the openings in the duct sections that sounds of a wide range of frequencies will be absorbed, the sizes and shapes of the openings in the duct sections being such that the dead air spaces can be maintained at the minimum thickness as mentioned previously.

Still another object of this invention is to provide a silencer for the exhaust of a gas turbine which silencer has a plurality of coaxial duct sections disposed to form an inner exhaust gas receiving and conducting passage surrounded by one or more substantially dead air spaces, the inner duct section at least being formed of a sheet material having a multitude of slits of extremely narrow width, the slits cooperating with the surrounding air space to provide a resonator for damping sounds in a high-frequency range.

A further object of this invention is to provide a sheet material for use as an acoustic material in the formation of a silencer for the exhaust of a gas turbine of the character set forth in the next preceding paragraph.

A still further object of this invention is to provide a silencer, for the exhaust of a gas turbine, having a plurality of coaxial duct sections disposed to form an inner exhaust gas receiving and conducting passage surrounded by two substantially dead air spaces separated by a sleeve, the first duct section being formed of a sheet material having a multitude of slits of extremely narrow width which provide restricted throats, the sleeve between the dead air spaces having a plurality of larger openings formed to provide throats with less restriction and greater length than the throats in the first duct section, the throats and air spaces forming resonators which complement one another to damp sounds over a relatively wide range of frequencies.

Another object of this invention is to provide the openings in the dead air space separating sleeve of the silencer, set forth in the next preceding paragraph, with inserts having openings with a double bellmouth shape which forms throats of a size predetermined to cause the resonators produced thereby to be tuned to absorb sounds in a relatively low-frequency range.

Another object of the invention is to provide a silencer for the exhaust of a gas turbine having a plurality of coaxial duct sections disposed to form an inner passage for receiving the exhaust gases from the turbine and conducting them to a discharge point, an intermediate passage surrounding the inner passage and communicating therewith at one end adjacent the exhaust gas outlet from the turbine so that an ejector effect will be created to somewhat lower the pressure in the intermediate passage, and an outer passage which communicates with the intermediate passage at the other end, the outer passage having limited communication with a source of cooling air such as the ambient atmosphere or the interior of an aircraft fuselage, the duct sections having openings of double bell-mouth shape which function as resonator throats to damp sounds and through which a limited flow of cooling air may take place to protect the duct sections from the high temperatures of the exhaust gases, the flow being such that the throats will be maintained open and clear of soot or other deposits from the exhaust gases.

Another object of this invention is to provide an acoustical material adapted for use in silencers for the exhaust of a gas turbine and other uses, the material being of relatively thin sheet type provided with a multiplicity of narrow elongated slits arranged in any desirable order, but preferably uniformly distributed, the number and size of the slits providing the sheet with a permeability most suitable for the dissipation of sounds resulting from the high velocity discharge of gases from the turbine.

Still another object of this invention is to utilize a method in the formation of the acoustical material mentioned in the preceding paragraph which will provide the elongated slits with rounded edges on both sides of the sheet to cause the slits to have double-bellmouth-shaped, transverse cross sections, the method of forming also being such that the maximum transverse width of opening at the narrowest dimension will not exceed a small fraction of the thickness of the material whereby a predetermined permeability of the sheet will be secured, yet the strength of material required for the particular use may be preserved.

The foregoing and other features and objects of the invention will be apparent from the following more detailed description of several adaptations of the invention illustrated in the accompanying drawings, in which:

FIG. 3 is a similar view on an enlarged scale taken on the plane indicated by the line III—III of FIG. 1 to show some internal construction;

FIG. 4 is an enlarged detail sectional view corresponding to FIG. 3 of a silencer having a slightly modified internal construction;

FIG. 5 is an elevational view of a piece of acoustical material formed in accordance with the invention and used in the silencer shown in FIG. 1;

FIG. 6 is a detail sectional view through the acoustical material on the plane indicated by the line VI—VI of FIG. 5;

FIG. 7 is a similar view on a greatly enlarged scale taken on the plane indicated by the line VII—VII of FIG. 6;

FIG. 8 is a perspective view of a piece of material after a step in the process of producing the acoustical sheet shown in FIG. 5 has been performed thereon;

FIG. 9 is a detail sectional view taken through the material on the plane indicated by the line IX—IX of FIG. 8;

FIG. 10 is an elevational view of a piece of a slightly modified form of acoustical material embodying the invention;

FIG. 11 is a detail sectional view taken through the material shown in FIG. 10 on the plane indicated by the line XI—XI of such Figure;

FIG. 12 is an elevational view of a piece of material following the performance of an early step in the production of the acoustical material shown in FIG. 10; and FIG. 13 is a detail sectional view through the piece of material shown in FIG. 12 on the plane indicated by the line XIII—XIII of such Figure.

Figure 1:
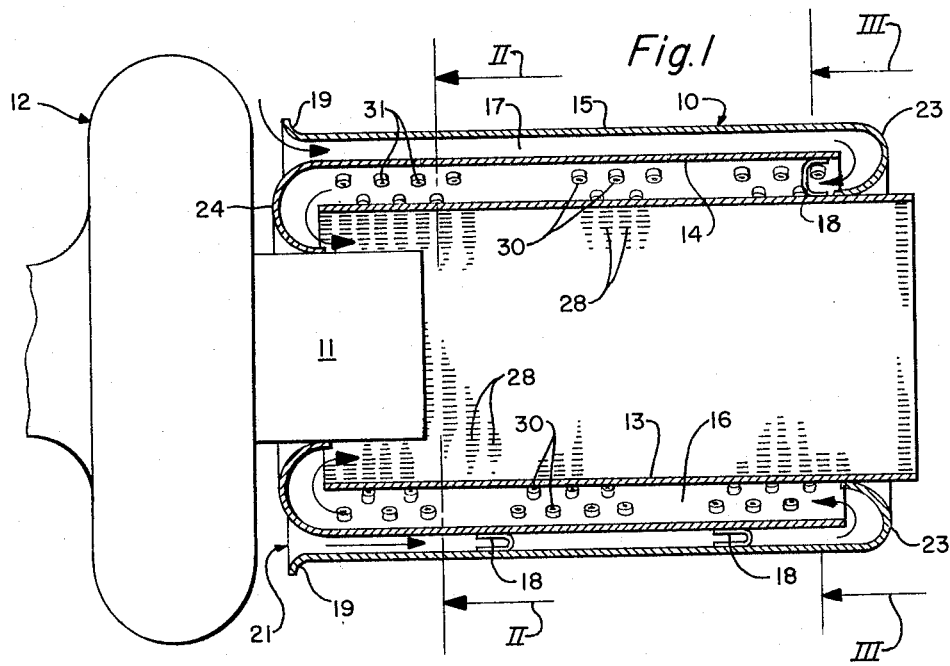
FIG. 1 is an axial sectional view taken through a gas turbine silencer formed in accordance with the invention.
Figure 2:
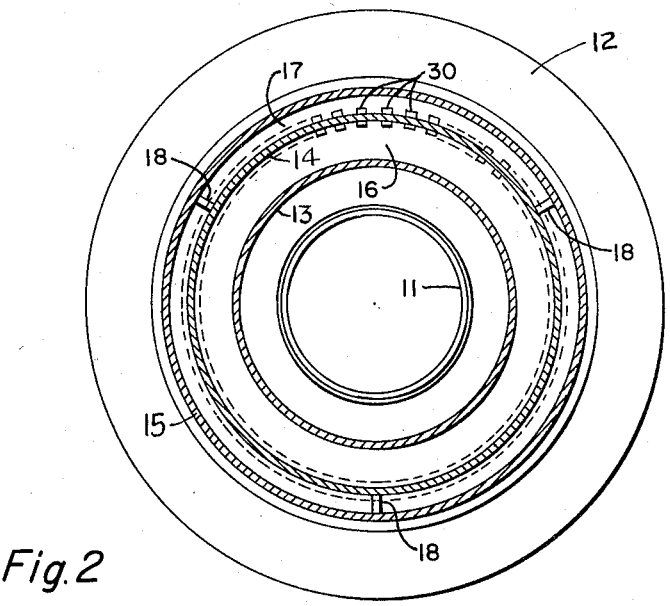
FIG. 2 is a vertical transverse sectional view of the silencer taken on the plane indicated by the line II—II of FIG. 1.

More particular reference to FIG. 1 of the drawings will show that the silencer 10 selected for illustrating the invention is mounted in axial registration with the exhaust pipe 11 of a gas turbine 12. Silencer 10 includes coaxially arranged tubular duct sections 13, 14 and 15, the latter serving as the housing or outer casing of the device. In certain installations the outer casing may be formed by the streamlined covering of a pod or a portion of the fuselage of an aircraft.

Duct section 13, the innermost of such sections, serves as an extension of the exhaust pipe 11 receiving the exhaust gases and conducting them to a suitable point of discharge. The section 13 is somewhat larger in transverse dimension than the exhaust pipe 11 which will permit a reduction in velocity as well as some expansion of the gases. Other advantages or functions will be set forth hereinafter.

Duct section 14 is spaced radially outwardly from section 13 and section 15 is similarly disposed relative to section 14 so that substantially annular chambers or air spaces 16 and 17 surrounding the inner and intermediate ducts will be provided. To obtain optimum sound absorbing or dissipating effects, the chambers 16 and 17 should have some of the characteristics of dead air spaces; for example, the ability to cushion the sound impulses or vibrations. The duct sections form substantially parallel walls which may be held in spaced relation by suitably formed clips, indicated generally by the numeral 18, which will permit some relative longitudinal movement between the sections to accommodate variable change in length due to nonuniform heating and cooling. The outer duct section is made of relatively imperforate material and may, if desired, be flared slightly, as at 19, at its forward end to form an enlarged entrance 21 and facilitate the flow of ambient air into the chamber 17. Such incoming air may be from the atmosphere or from the interior of an enclosure such as the fuselage of an aircraft in which the gas turbine is mounted. It is obvious that air could be admitted to the casing from the outside atmosphere through suitable openings (not shown) formed in the wall of the aircraft fuselage if desired.

The rear end of duct section 14 is spaced from duct 15 and the latter is formed with a reverse bend 23 to permit the smooth flow of air to the chamber 16. Similarly, the opposite or forward end of the inner duct section 13 is spaced from section 14 and the latter is provided with a reverse bend 24 to direct air from space 16 to the gas receiving and conducting passage formed by the inner duct section 13. The spacing of the latter section from the exhaust pipe permits the outwardly flowing exhaust gases to cause an ejector action whereby some flow of air from passage 16 to the outlet will take place. The unit will thus be cooled by ambient air entering the inlet 21 to passage 17, flowing forwardly in passage 16 and then being drawn into the exhaust gas passage and mixed with the exhaust gases flowing outwardly thereof. Some cooling of the exhaust gases will be accomplished in this manner.

As in application Serial No. 304,314, the duct sections 13 and 14 are so constructed that they will function as laminar sound absorbers. A laminar sound absorber is a thin, sheetlike member that is porous or fluid permeable because it is possessed of numerous small air paths through the sheet providing acoustic flow from one surface of the sheet to the other, the sheet having a viscous flow restriction that is of the same order of magnitude as the specific acoustic impedance of the fluid, i.e., the viscous flow restriction differs from the specific acoustic impedance by less than a factor of 10. Typical materials used have a flow resistance in the vicinity of 30 to 50 rayls, but a wider range of perhaps 10 to 125 rayls is considered to be suitable. Thus, airborne sound waves are able to enter and pass through the sheet along these small air paths, losing intensity as they progress through the sheet. In the silencer of this invention the material employed for duct section 13 is sheet metal, such as stainless steel of suitable thickness, depending upon the structural requirements, having a large number of very fine slits 28 formed therein. These slits have a width bearing a predetermined relation to the thickness of the sheet which will depend upon the particular installation, the slit width being preferably not in excess of a fraction of the thickness of the metal and typically in the range of from .003 to .006 inch with sheet material of from .020 to .030 as may be determined by the desired viscous flow resistance. It has been found that by forming the inner duct section 13 of such slit metal and backing it with an air space, sounds of a relatively high frequency will be suitably absorbed, so effectively in fact that sounds of a lower frequency such as "combustion rumble" which are not damped by the first laminar absorber become more obvious.

It is therefore an object of this invention to supplement the first laminar absorber with a second one which is so designed and constructed that lower frequency sounds will also be absorbed but without objectionably increasing the size of the finished silencer. This result is secured by providing the intermediate tubular duct section 14 with a plurality of sound resonators 30. The elements 30 comprise relatively short pieces of rod or tubing constructed to provide openings 31 establishing restricted communication between the interior and exterior of the duct section 14. Openings 31 are preferably given a bellmouth configuration at both ends whereby a reduced throat with a smooth aerodynamic shape for acoustical flow in both directions is produced. This throat plus the length of orifice and required backing space 17 provide the required sound absorbing characteristics. The elements 30 are spaced longitudinally and circumferentially of the duct section 14 at suitable distances depending upon the size of the duct section and the particular application. The resonators 30 may be formed of rod with drilled double-bellmouth openings 31 or they may have a slightly modified construction, as shown in FIG. 4, by being formed of tubing with a double-bellmouth shape, pressed, spun or otherwise imparted thereto. The modified form may be more desirable since the finished part will be considerably lighter in weight.

FIGS. 5 to 13, inclusive, illustrate two forms of acoustical materials, which may be used in the inner duct section, and certain steps in the method of producing them. FIG. 5 shows a piece of metal having a large number of small slits arranged in longitudinally and transversely extending rows. The width of the slits in FIG. 5 is exaggerated for illustrative purposes since, as previously pointed out, the preferred width is a small fraction of the thickness of the metal sheet (between .003 and .006 inch for sheet material with a thickness between .020 and .030 inch). Each slit thus bears a definite relation to the thickness of the material. The lengths of the slits may vary depending upon their configuration; however, the slits should be at least twenty times and preferably fifty or even one hundred times as long as they are wide. Due to the narrow width of the slits, a special method of producing the finished sheet has been conceived and developed. This method, which constitutes a part of this invention, is as follows:

The sheet (which may be of stainless or other suitable material of the thickness required by the particular situation) is first stamped or rolled to corrugate and cut it along predetermined lines, the rolling or stamping instrumentalities being shaped to move portions 32 and 33 of the materials at the sides of the cuts in opposite directions. A piece of material after this step in the method has been performed is shown in FIGS. 8 and 9, from which it will be observed that portions 32 are bent up and portions 33 are bent down, thus exposing the edges of the material at the sides of the cuts. The material is then subjected to a bath in an acid or other suitable chemical etching solution which bath is timed to remove a predetermined amount of the material from the exposed edges. The thickness of material removed would obviously be approximately one half of the desired width of the slits. While some etching of the top and bottom surfaces of the sheet may take place, this will be negligible as the length of time of exposure of the material to the bath will be insufficient to deleteriously affect the finished product. If desired, the etching on the top and bottom surfaces of the sheet could be prevented by coating them prior to the forming step with an acid resisting varnish or other chemical and thereby limiting the etching operation to the side edges of the cuts which are exposed by the forming step. After the etching step, the sheet is stamped or rolled to a flat condition wherein the portions at the sides of the cuts are returned to their original positions in the plane of the sheet. As a result of the etching step, the cuts have been changed into slits of the desired width. It will be observed from FIG. 7, which is a greatly magnified transverse sectional view through a fragment of the sheet at one slit, that due to the sharp corners produced by the cutting operation, the etching thereof will be slightly accelerated and the slit edges will be rounded, as at 34, thus giving the slits a double-bellmouth, transverse, cross-sectional configuration. The throat of such double-bellmouth shape will not exceed the maximum dimension, i.e., a small fraction of the thickness of the material, previously set forth. This double-bellmouth configuration contributes to the hound absorption quality of the finished sheet.

It should be clear that the slits do not have to be of any particular longitudinal shape, the only requirement being that they provide the requisite sound absorbing quality without excessively diminishing the strength of the sheet. FIGS. 10 and 11 show a piece of acoustic material with a different form of slit 35. FIGS. 12 and 13 illustrate one of the steps in the method of producing such sheet. In this form of sheet the slits 35 are of substantially U-shaped configuration and are uniformly distributed over the area of the sheet. This sheet may also be stamped or rolled to produce the U-shaped cuts 36 at the sides of which the metal is relatively displaced, as at 37, to expose the edges. After this step the edges of the cuts are etched as before so that after the displaced metal is returned to the plane of the sheet the slits 35 with the requisite width and desired configuration will be provided. The acoustical sheets produced by the method illustrated in FIGS. 5-13 may then be used to produce the inner duct section.

Through the use of the method illustrated and described, the ultimate permeability desired in the final product may be secured. Permeability of a sheet material depends upon and is measured by the flow resistance ($r$) of the sheet and also the mass reactance (inertia) of the air or other fluid in the openings in the sheet; the ratio of ($r$) to mass reactance of the air or gas in the openings is very important acoustically. Flow resistance ($r$), as used herein, means the measure of the volume of flow ($u$) through a unit area of the permeable sheet per unit of time (cubic centimeters per second per square centimeter, for example) for any particular difference in pressure ($p$) between the two surfaces of the material. This definition and relationship may be expressed by the formula $r=p/u$. It will be understood that the permeability depends not only on the size and configuration or shape of the openings but also on the number or total amount of openings per unit of area. For acoustical purposes, the size of the openings should be very closely controlled in order to control the flow resistance and mass reactance of the air or gas in the openings, and the arrangement and distribution should be such as to provide the greatest number or total accumulated length of openings per unit area consistent with the desired final strength of the sheet.

In the operation of a gas turbine equipped with a silencer embodying the principles of the invention, the exhaust gases are discharged from the pipe 11 into the passage formed by the duct section 13. Sound waves emanating from the gas stream move in all directions and will strike the laminar sound absorbing surface of the duct section 13. Since the duct section 13 is constructed of material having a large number of fine hairline slits and is backed up by a substantially dead air space, the high-frequency sounds will be substantially absorbed. Sounds of lower frequency passing through the wall 13 will be damped by the laminar sound absorber formed by wall 14, its resonators 30 and the air space surrounding such wall.

The principle of operation of a simple resonator having a single throat and single air space is well known. The air space provides a stiffness analogous to a mechanical spring or electrical capacitance, and in fact its measure is called "acoustic capacitance." The fluid in and near the throat has inertia and behaves as a small mass. This property is called "acoustic inertance." The resonator behaves in a manner analogous to a simple mass-spring or electrical L–C circuit.

The energy absorbed by the resonator at resonance depends rather critically on its damping. The damping is due to viscous flow in the throat and also to turbulent flow in the throat as fluid alternately flows into and out of the air cavity in response to the fluctuating sound pressure. Maximum energy dissipation occurs only if the acoustic resistance is carefully matched to the specific acoustic impedance of the fluid.

Distributed resonators operate in much the same manner as a single resonator. The distributed resonator has a plurality of throats served by the same air cavity. Each throat may be considered to be associated with a particular part of the total air cavity. For any distributed resonator there always exists an equivalent simple resonator.

The resonant frequency is inversely proportional to the square root of the acoustic inertance and also inversely proportional to the square root of the acoustic capacitance. As a result, for a given value of acoustic capacitance (cavity size) a resonator is tuned by adjusting the acoustic inertance. This is done by changing the size, number and geometry of the throats. This process is complicated mainly by the fact that the acoustic resistance must also be kept at the right value and it is usually difficult, and often impossible, to calculate it for any given array of throats. One reason for the difficulty in calculating the acoustic resistance is the fact that it is partly due to viscous flow and partly due to turbulent flow. This may be shown by study of its rather closely related resistance to nonalternating flow induced by small pressure differentials. The viscous flow resistance is fairly independent of the differential pressure, but the turbulent flow component changes very rapidly as differential pressure changes. The result is a nonlinear flow resistance which means that the customary resonator throats, simple holes, or tubes can possess optimum damping at only one pressure differential, i.e., at only one sound pressure level.

Because of these difficulties, it is customary to design a resonator for a desired frequency and very little damping and then if optimum damping is desired, to adjust the damping by a separate structure such as fibrous material in the throat or air cavity. This approach to providing optimum damping is undesirable in a gas turbine exhaust silencer because of the fire hazard created by retained fuel.

Since optimum acoustical resistance is fixed by the fluid and the volume of the air cavity is fixed by other design limitations, the tuning must be accomplished by adjusting the throats. The ratio of the acoustic inertance to the acoustic resistance is the critical parameter which defines how high a frequency or how low a frequency can be attained for a given air space and still preserve optimum damping without the use of augmented damping. Thus, to tune to a very high frequency, the ratio of acoustic inertance to acoustic resistance must be as small as possible. To tune to a very low frequency, the ratio of acoustic inertance to acoustic resistance must be as large as possible.

It has been found that an efficient high-frequency distributed resonator can be made by providing a great multiplicity of throats, each of which is a very narrow slit whose width is only a fraction of the thickness of the sheet material from which it is made. Best results are obtained if the length of the slit is at least twenty times the width of the slit. Throats made in this manner exhibit flow resistance and hence acoustic resistance which is mainly viscous in nature. The turbulent flow component of the resistance is subordinated to such an extent that the flow resistance is fairly independent of its differential pressure. The width of the slits can be easily adjusted, for example, by chemical etching, to provide optimum damping without the use of fibrous materials. The damping is then fairly constant as sound pressure is varied. Thus the previously described design difficulties are removed. The dominance of viscous resistance over turbulent flow resistance is improved if the corners of the slits are rounded to promote better air flow conditions and discourage turbulence. Thus the unique features of the high-frequency resonator throats are as follows:

A great multiplicity of throats are formed in a sheet material. Each slit is narrow compared to the thickness of the metal and long compared to its width. Each slit preferably has rounded corners. The average flow resistance through the slits is adjusted so that the flow resistance per unit area of sheet is of the same order of magnitude as the specific impedance of the fluid in which the resonator is to operate. The flow resistance is to be measured, using the same fluid in which the resonator will operate, and the differential pressures used in measuring flow resistance should be about the same as the sound pressure fluctuations which occur across the resonator throat.

To tune to very low frequencies, the ratio of acoustic inertance to acoustic resistance must be made as large as possible. Acoustic resistance must be made optimum to match the specific impedance of the fluid as before. Ordinarily to tune to very low frequencies the volume of the cavity must be increased. This is because if acoustic inertance is increased by resorting to smaller holes, a point is soon reached at which the damping is excessive. Slits are not suitable for low-frequency resonators because they tend to decrease the ratio of inertance to resistance. A round or nearly round opening is preferred. Simple round holes or cylindrically shaped openings exhibit to a marked degree the nonlinear flow resistance previously described and it is therefore very difficult to provide optimum damping in such a system.

It has been discovered that if the throat has the shape of a double bellmouth, several important changes occur. The acoustic inertance is the same as for a simple cylindrical throat having the same length and a diameter equal to the minimum diameter of the bellmouth. The flow resistance and/or acoustic resistance is very much reduced as compared to the cylinder or even as compared to a simple hole having the same diameter as the smallest diameter of the bellmouth. Furthermore, the resistance changes only slowly with changes in differential pressure, and in fact the change is as little as is the change for the slit-type throats. This appears to be because the turbulent flow component of the flow resistance has been subdued and viscous resistance is dominant. In this way the ratio of acoustic inertance to acoustic resistance has been substantially increased. Optimum and nearly linear damping is then attained by proper selection of the size and number of double bellmouths. The net result is a distributed resonator which can be tuned to very low frequencies for very limited air cavity volumes.

The unique features of the low-frequency resonator throats are as follows: Each throat is shaped in the manner of a double bellmouth, the two halves of which are joined at their small ends. These extend through a sheet of material which is impervious to flow such as sheet metal. They are sized and spaced to provide, at the same time, the desired value of acoustic inertance and a value of acoustic resistance per unit area of the sheet of the same order of magnitude as the specific impedance of the fluid in which the resonator is to operate.

In accordance with established theory, a high-frequency resonator and a low-frequency resonator may be placed in series and their attenuations will be essentially additive provided that the high-frequency resonator is nearest the noise source.

As a practical matter the air cavities need not be completely closed or sealed. The air spaces may be vented for the drainage of fuel or for the circulation of cooling air. The effect of the openings is very complex to analyze but in general tends to produce a desirable broadening of the tuning at the expense of some absorption at the original resonant frequency.

I claim:

1. A silencer for the exhaust of a gas turbine, comprising: a plurality of tubular duct walls disposed in coaxial relationship to provide an inner passage to receive and conduct the exhaust gases and inner and outer surrounding air chambers, the wall of the inner passage and that of the inner surrounding air chamber being provided with a plurality of spaced resonator throats of different cross-sectional areas and axial lengths establishing communication between opposite sides thereof.

2. A silencer for the exhaust of a gas turbine, comprising: a plurality of tubular duct walls disposed in coaxial relationship to provide an inner passage to receive and conduct the exhaust gases and inner and outer surrounding air chambers, the wall of the inner passage having a multiplicity of slits to form resonator throats of minute transverse dimension and of an axial flow length equal to the thickness of the wall, the wall of the inner surrounding air chamber being provided with a plurality of spaced resonator throats of larger transverse dimension and greater axial flow length, said throats establishing communication between opposite sides of said walls.

3. A silencer for the exhaust of a gas turbine, comprising: a plurality of tubular duct walls disposed in coaxial relationship to provide an inner passage to receive and conduct the exhaust gases and inner and outer surrounding air chambers, the wall of the inner passage having a multiplicity of slits of minute width extending therethrough and the wall of the inner surrounding air chamber being provided with a plurality of spaced openings with bellmouth-shaped ends to form resonator throats establishing communication between the inner and outer surrounding air chambers.

4. A silencer for the exhaust of a gas turbine, comprising: a plurality of tubular duct walls disposed in coaxial relationship to provide an inner passage to receive and conduct the exhaust gases and inner and outer surrounding air chambers, the inner surrounding air chamber having substantially unrestricted communication with the inner passage adjacent the gas inlet end and with the outer surrounding air chamber at the opposite end, the wall of the inner passage having flow restricting openings of minute size extending therethrough to attenuate noises in a relatively high-frequency range, the wall of the inner surrounding air chamber having larger flow restricting openings extending therethrough to attenuate noises in a relatively low-frequency range.

5. A silencer for the exhaust of a gas turbine, comprising: a plurality of tubular duct walls disposed in coaxial relationship to provide an inner passage to receive and conduct the exhaust gases and inner and outer surrounding air chambers, the wall of the inner passage having a plurality of slits with a width not exceeding a fraction of the thickness of the material extending therethrough, the wall of the inner surrounding air chamber being provided with a plurality of tubular inserts with bellmouth-shaped ends forming restricted throats establishing communication between the inner and outer surrounding air chambers.

6. A silencer for the exhaust of a gas turbine, comprising: a plurality of tubular duct walls disposed in coaxial relationship to provide an inner passage to receive and conduct the exhaust gases and inner and outer surrounding air chambers, the wall of the inner passage having longitudinally and circumferentially extending rows of slits with a width not exceeding a small fraction of the thickness of the wall extending therethrough, the wall of the inner surrounding air chamber being provided with a plurality of tubular inserts having bellmouth-shaped ends forming throats establishing communication between the inner and outer surrounding air chambers.

7. A silencer for the exhaust of a gas turbine, comprising: a plurality of tubular duct walls disposed in coaxial relationship to provide an inner passage to receive and conduct the exhaust gases and inner and outer surrounding air chambers, the inner surrounding air chamber communicating with the inner passage adjacent the gas inlet end and with the outer surrounding air chamber at the opposite end, the wall of the inner passage having flow restricting openings extending therethrough with transverse dimensions not exceeding a small fraction of the thickness of the wall, the wall between the inner and outer surrounding air chambers having flow restricting openings extending therethrough, the latter openings having bellmouth-shaped ends forming restricted throats and axial lengths of predetermined dimensions.

8. In a silencer for the exhaust of a gas turbine, a tubular duct wall in position for exhaust gas flow over at least one surface, said wall having a multiplicity of slits extending therethrough, such slits having a width not exceeding a small fraction of the thickness of the wall, said wall having a viscous flow restriction that is of the same order of magnitude as the specific acoustic impedance of the gas, the thickness of the duct wall being uniform throughout the length and circumference of the duct.

9. In a silencer for the exhaust of a gas turbine, a tubular duct wall in position for exhaust gas flow over at least one surface, said wall having a plurality of rows of spaced slits extending through the wall, the slits having a width not more than one-half the thickness of the wall, said wall having a viscous flow restriction that is of the same order of magnitude as the specific acoustic impedance of the gas, such wall thickness being uniform throughout the length and circumference of the duct.

10. In a silencer for the exhaust of a gas turbine, a tubular duct wall having a plurality of tubes extending therethrough substantially normal to the duct axis, each tube having a bellmouth at each end to form a reduced throat therein to establish communication between the interior and exterior of the duct wall.

11. In a silencer for the exhaust of a gas turbine, a tubular duct wall having a plurality of rows of spaced tubes extending therethrough substantially normal to the duct axis, each tube having a bellmouth shape at each end to form a reduced smooth-surfaced throat therein to establish restricted communication between the interior and exterior of the duct wall.

12. An acoustic material adapted for use in a silencer for the exhaust of a gas turbine, comprising: a relatively thin, smooth sheet having a multiplicity of substantially duplicate openings, said sheet being in position for exhaust gas flow over at least one surface, said openings being distributed substantially uniformly throughout the area of the sheet, the width of each of said openings being a fraction of the thickness of said sheet, the side edges of said openings being substantially parallel to one another and disposed in the plane of the sheet, the finished sheet being of uniform thickness throughout the length and width and having a predetermined permeability, said sheet having a viscous flow restriction that is of the same order of magnitude as the specific acoustic impedance of the gas.

13. A sheet material for acoustical use, comprising: a smooth sheet of material of predetermined thickness having a multiplicity of substantially uniform openings, said sheet being in position for exhaust gas flow over at least one surface, said openings being arranged in closely spaced relation throughout the area of said sheet, said openings being of predetermined arrangement and distribution throughout the area of the sheet and of a substantially uniform width not exceeding a predetermined fraction of the thickness of the material, said sheet being of uniform thickness throughout the length and width thereof, each of said openings having a predetermined flow resistance consistent with the total flow resistance per unit area of the sheet, said sheet having a viscous flow restriction that is of the same order of magnitude as the specific acoustic impedance of the gas.

14. A sheet material for acoustical use, comprising: a sheet of predetermined thickness, said sheet being in position for exhaust gas flow over at least one surface, said sheet having a plurality of elongated, curved openings a predetermined fraction of the thickness of the sheet in width throughout their length and distributed substantially uniformly throughout the area of the sheet, the side edges of the openings being parallel and in the plane of the sheet, the thickness of the sheet being uniform throughout the length and width, the number and size of the openings giving the finished sheet a predetermined permeability, said sheet having a viscous flow restriction that is of the same order of magnitude as the specific acoustic impedance of the gas.

15. A sheet material for acoustical use, comprising: a sheet of predetermined thickness having a plurality of elongated, slit-type openings a fraction of the sheet's thickness in width extending therethrough, said openings having rounded edges on opposite sides of the sheet to provide the openings with transverse, cross-sectional, double-bellmouth configurations, the narrowest part of each opening having a width not exceeding one-half the thickness of the sheet.

16. A sheet material for acoustical use, comprising: a sheet of predetermined thickness having a plurality of elongated, slit-type openings a fraction of the sheet's thickness in width extending therethrough, said openings having rounded edges on opposite sides of the sheet to provide the openings with transverse, cross-sectional, double-bellmouth configurations, the narrowest part of each opening have a width between .003 and .006 inch, the edges of the slits being disposed in the plane of the sheet.

17. A distributed resonator throat construction, comprising: a piece of sheet material having a plurality of spaced openings extending therethrough with the flow axis of the openings normal to the faces of the sheet, each of the openings having enlarged ends and a reduced intermediate portion, the openings having aerodynamically smooth wall surfaces and being adjusted so that the acoustic resistance thereof bears a predetermined ratio to the acoustic impedance of the fluid in which the resonator is to operate.

18. A distributed resonator throat construction, comprising: a piece of sheet material having a plurality of spaced, aerodynamically smooth-walled openings extending therethrough with the flow axis of the openings normal to the faces of the sheet, each of the openings having flared ends at opposite sides of the sheet connected by a throat having a reduced transverse cross section, the openings being adjusted so that the acoustic resistance per unit area of sheet thereof substantially matches the specific acoustic impedance of the fluid in which the resonator is to operate.

19. A sheet material for acoustical use, comprising: a metal sheet of predetermined thickness, said sheet being in position for exhaust gas flow over at least one surface, said sheet having a plurality of longitudinally and transversely extending rows of elongated openings a predetermined fraction of the thickness of the sheet in width throughout their length, the side edges of the openings being uniformly smooth and disposed in the plane of the sheet, the thickness of the sheet between the openings in the rows and between the rows of openings being uniform, the number, shape, and size of the openings providing the sheet with a predetermined permeability, said sheet having a viscous flow restriction that is of the same order of magnitude as the specific acoustic impedance of the gas.

References Cited by the Examiner

UNITED STATES PATENTS

| | | | |
|---|---|---|---|
| 1,542,829 | 6/1925 | Oldberg | 181—55 X |
| 1,854,830 | 4/1932 | Flanders | 181—33 |
| 1,918,149 | 7/1933 | Sullivan. | |
| 1,938,973 | 12/1933 | Oldberg | 181—48 |
| 1,991,206 | 2/1935 | Harrison. | |
| 2,118,056 | 5/1938 | Peik | 181—54 |
| 2,332,543 | 10/1943 | Wilson | 181—48 |
| 2,595,047 | 4/1952 | Baranek | 181—33 |
| 2,934,891 | 5/1960 | Brown | 181—33 |
| 2,988,302 | 6/1961 | Smith | 181—51 X |
| 2,990,905 | 7/1961 | Lilley | 181—33 |
| 3,112,008 | 11/1963 | Ludlow | 181—59 |
| 3,151,701 | 10/1964 | Duthion et al. | 181—33 |

FOREIGN PATENTS

| | | |
|---|---|---|
| 564,474 | 11/1932 | Germany. |
| 646,384 | 11/1950 | Great Britain. |
| 829,012 | 2/1960 | Great Britain. |

OTHER REFERENCES

Noise Control: periodical, issue of July 1955, pages 37–41 and 54, vol. 1, No. 4.

RICHARD B. WILKINSON, *Primary Examiner.*

LEO SMILOW, LOUIS J. CAPOZI, *Examiners.*

R. S. WARD, *Assistant Examiner.*